United States Patent [19]

Maki

[11] Patent Number: 4,839,851

[45] Date of Patent: Jun. 13, 1989

[54] PROGRAMMABLE DATA PATH DEVICE

[75] Inventor: Gary K. Maki, Moscow, Id.

[73] Assignee: Idaho Research Foundation, Inc., Moscow, Id.

[21] Appl. No.: 72,519

[22] Filed: Jul. 13, 1987

[51] Int. Cl.⁴ .................. G06F 15/20; G06F 15/31
[52] U.S. Cl. .................. 364/900; 364/931.4; 364/937.1
[58] Field of Search ............ 364/200 MS, 900 MS

[56] References Cited

U.S. PATENT DOCUMENTS

| | | | |
|---|---|---|---|
| 3,815,095 | 6/1974 | Wester | 364/200 |
| 4,336,601 | 6/1982 | Tanaka | |
| 4,458,163 | 7/1984 | Wheeler et al. | |
| 4,490,812 | 12/1984 | Guterman | |
| 4,541,048 | 9/1985 | Propster et al. | 364/200 |
| 4,551,814 | 11/1985 | Moore et al. | |
| 4,574,348 | 3/1986 | Scallon | 364/200 |
| 4,580,215 | 4/1986 | Morton | 364/200 |
| 4,783,738 | 11/1988 | Li et al. | 364/200 |

Primary Examiner—Gareth D. Shaw
Assistant Examiner—Rebecca L. Rudolph
Attorney, Agent, or Firm—Christensen, O'Connor, Johnson & Kindness

[57] ABSTRACT

A programmable data path device capable of operating as a general purpose hardware accelerator. The device includes a plurality of processing cells, memory such as RAM or EPROM for storing data path control words, and an address module for sequentially providing data path control words to the processing cells. Each cell includes an ALU, a multiplexer and a register. For each cell, in response to the data path control word, the multiplexer selectively couples the contents of one register to one of the ALU input ports, and the ALU performs a selected operation and places its output into the register of that cell. Thus, through the data path control words, a device can be configured to operate in a sequential, pipeline, or parallel mode, permitting a wide variety of digital signal processing functions to be performed with a single system.

8 Claims, 9 Drawing Sheets

CONTROL STATES

| | P1 | P2 | P3 | P4 | P5 | ... | P$_{n-1}$ | P$_n$ |
|---|---|---|---|---|---|---|---|---|
| t1 | 1 | 0 | 0 | 0 | 0 | | 0 | 0 |
| | 1 | 1 | 0 | 0 | 0 | | 0 | 0 |
| | 1 | 1 | 1 | 0 | 0 | | 0 | 0 |
| | 1 | 1 | 1 | 1 | 0 | | 0 | 0 |
| | 1 | 1 | 1 | 1 | 1 | | 0 | 0 |
| | ⋮ | | | | | | | |
| | 1 | 1 | 1 | 1 | 1 | | 1 | 0 |
| t2 | 1 | 1 | 1 | 1 | 1 | | 1 | 1 |
| | ⋮ | | | | | | | |
| | 1 | 1 | 1 | 1 | 1 | | 1 | 1 |
| t3 | 0 | 1 | 1 | 1 | 1 | | 1 | 1 |
| | 0 | 0 | 1 | 1 | 1 | | 1 | 1 |
| | 0 | 0 | 0 | 1 | 1 | | 1 | 1 |
| | 0 | 0 | 0 | 0 | 1 | | 1 | 1 |
| | 0 | 0 | 0 | 0 | 0 | | 1 | 1 |
| | ⋮ | | | | | | | |
| | 0 | 0 | 0 | 0 | 0 | | 0 | 1 |
| t4 | 0 | 0 | 0 | 0 | 0 | | 0 | 0 |

TIME

Fig. 1.

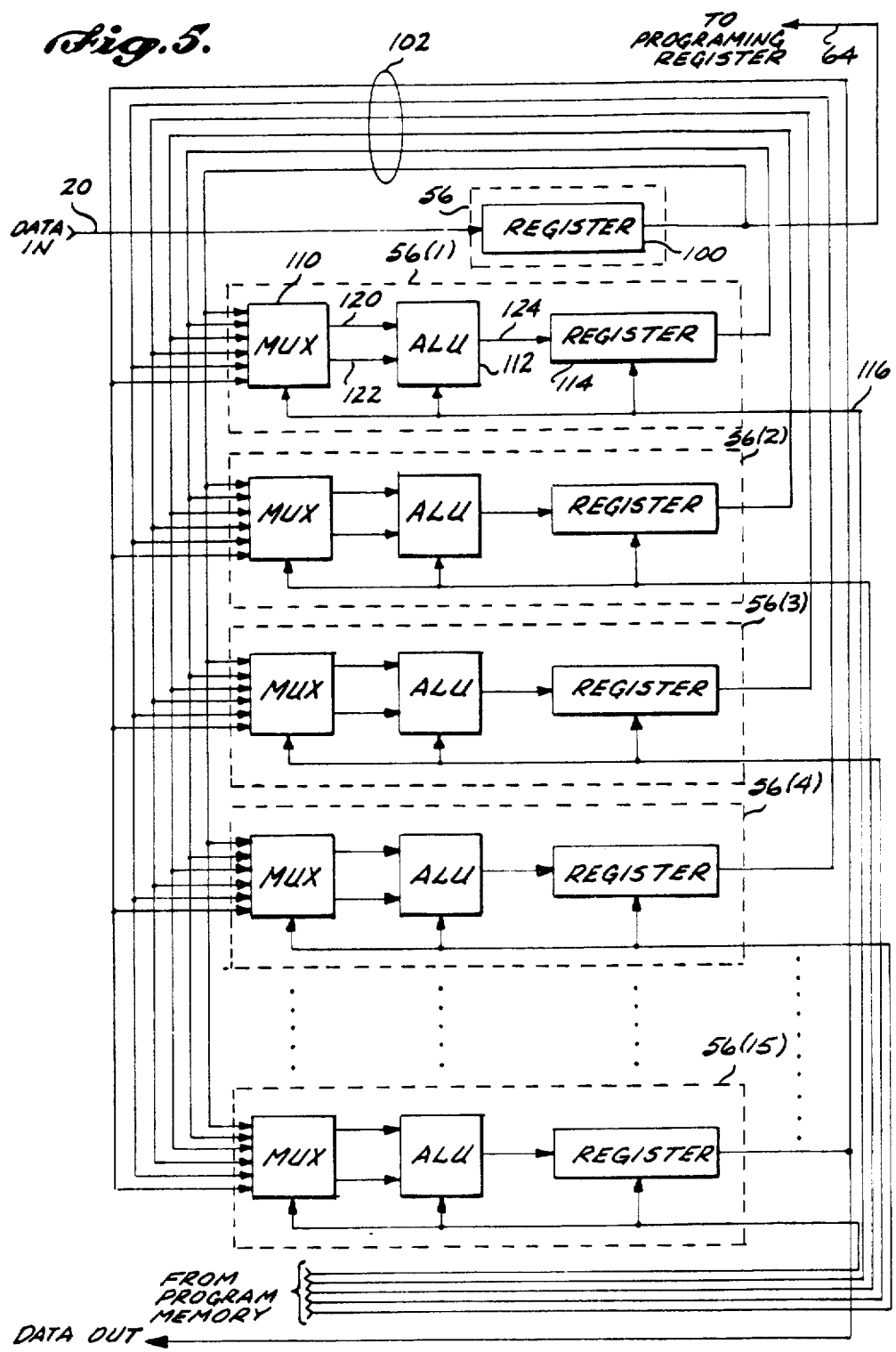

| LC3 | LC2 | LC1 | LC0 | LOGIC OPERATION |
|---|---|---|---|---|
| 0 | 0 | 0 | 0 | $0 \rightarrow z$ |
| 0 | 0 | 0 | 1 | $A \text{ AND } B \rightarrow z$ |
| 0 | 0 | 1 | 0 | $A \text{ AND } B' \rightarrow z$ |
| 0 | 0 | 1 | 1 | $A \rightarrow z$ |
| 0 | 1 | 0 | 0 | $A' \text{ AND } B \rightarrow z$ |
| 0 | 1 | 0 | 1 | $B \rightarrow z$ |
| 0 | 1 | 1 | 0 | $A \text{ XOR } B \rightarrow z$ |
| 0 | 1 | 1 | 1 | $A \text{ OR } B \rightarrow z$ |
| 1 | 0 | 0 | 0 | $A \text{ NOR } B \rightarrow z$ |
| 1 | 0 | 0 | 1 | $A \text{ XNOR } B \rightarrow z$ |
| 1 | 0 | 1 | 0 | $B' \rightarrow z$ |
| 1 | 0 | 1 | 1 | $A' \text{ NAND } B \rightarrow z$ |
| 1 | 1 | 0 | 0 | $A' \rightarrow z$ |
| 1 | 1 | 0 | 1 | $A \text{ NAND } B' \rightarrow z$ |
| 1 | 1 | 1 | 0 | $A \text{ NAND } B \rightarrow z$ |
| 1 | 1 | 1 | 1 | $1 \rightarrow z$ |

Fig. 8.

| RC1 | RC0 | REGISTER FUNCTION |
|---|---|---|
| 0 | 0 | HOLD PRESENT DATA |
| 0 | 1 | LOAD ADDER DATA |
| 1 | 0 | SHIFT ADDER RIGHT AND LOAD |
| 1 | 1 | SHIFT ADDER LEFT AND LOAD |

Fig. 9.

PROGRAMMABLE DATA PATH DEVICE

FIELD OF THE INVENTION

The present invention relates to digital hardware accelerators that operate alone or in conjunction with a general purpose computer.

BACKGROUND OF THE INVENTION

A hardware accelerator is a digital processor that generally operates much faster than a conventional stored program computer. A digital processor normally proceeds through a series of control states in the course of transforming raw data into final data. The states of a process may be designated by the set [P1, P2, ... Pn]. A set of data transfers are normally associated with each control state. Most data processors, such as most well-known microprocessors, are sequential processors in which only one control state is active at a given time. The sequential processor normally proceeds from control state Pi to Pi+1. If $T_p$ is the time associated with each control state Pi, the total computation time is equal to $nT_p$ (assuming no looping in the process), and the operation rate is $1/(nT_p)$.

A number of specialized processors have been built in an effort to avoid the limitations of sequential processors. One such specialized type of processor is a pipeline processor. In a pipeline processor, more than one control state is active at any given time, and the data passes through a set of control states that perform operations on the data, much like water flowing through a pipe. The operation of a pipeline processor is illustrated in FIG. 1. The horizontal axis in FIG. 1 represents the control states P1 ... Pn, and the vertical axis represents time, increasing in the downward direction. In the body of the figure, the symbol 1 represents an active control state, while the symbol 0 designates an inactive control state. At time t1, control state P1 becomes active, and the pipeline starts filling. At time t2, the pipeline is full, and all control states are active. At time t3, the pipeline begins emptying, and the pipeline becomes empty at time t4. The primary advantage of such a system is that after the pipe is full, the operation rate is $1/T_p$.

A second specialized form of processor is a parallel processor. When a processor is operating in the parallel mode, all control states Pi can be active at a given moment. However, it is not necessary to "fill" or "empty" all states as in a pipeline configuration. In a parallel processor with n states [P1 ... Pn], the operation rate is n multiplied by the operation rate of each state. In terms of the discussion above, the operation rate is $n*(1/T_p)$.

SUMMARY OF THE INVENTION

The present invention provides a data path device that includes a plurality of processing cells, each of which includes a multiplexer, an ALU, and a register. The operation of the data path device is controlled by a stored program. For each processing cell, the stored program provides data path control words that control the multiplexer and ALU. The set of data path control words for all cells comprises a process control word that defines a control state. The control state, in turn, defines the process carried out by the data path device. Thus, a single data path device can be user configured to operate in any combination of sequential, pipeline or parallel modes of operation, through control state specification.

The architecture of the programmable data path device of the present invention permits the device to operate as a general purpose hardware accelerator that allows program configuration of the register and ALU stack. For example in a typical application, the data path device would include the processing cells and a RAM for storing the program, and would be used in conjunction with a general purpose controller such as a standard microprocessor. In this arrangement, the RAM is addressable by the microprocessor, and thereby serves as the control unit for the hardware accelerator. The processing cell configuration is dynamic and determinable by the microprocessor, such that a wide variety of processing tasks can be addressed by a single system.

In one preferred embodiment, the programmable data path device comprises a plurality of processing cells, memory means for storing data path control words, and control means for sequentially providing data path control words to the processing cells. Each processing cell includes means for receiving a data path control word, ALU means, and multiplexer means. The ALU means has two input ports, one output port, and means for producing output data at its output port based on input data provided at its input ports and on the data path control word. Each processing cell also includes a register for receiving the output data from the ALU means of the processing cell of which the register is a part. The multiplexer means is responsive to the data path control word for selectively coupling the contents of one of the registers to one of the input ports. In a preferred embodiment, the multiplexer means comprises a first multiplexer for selectively coupling the contents of one of the registers to one of the input ports, and a second multiplexer for selectively coupling the contents of one of the registers to the other input port.

BRIEF DESCRIPTION OF THE DRAWINGS

FIG. 1 is a chart illustrating pipeline operation;

FIG. 5 is a more detailed block diagram of the data path module;

FIG. 8 is a table illustrating the logical operations performed by the logic unit;

FIG. 9 is a table illustrating the register control codes and functions;

FIG. 12 illustrates the architecture of FIG. 11 mapped onto the data path device of the present invention; and, FIG. 13 is a block diagram showing a parallel processing architecture for evaluating a digital filter.

DETAILED DESCRIPTION OF THE INVENTION

Figure 2:
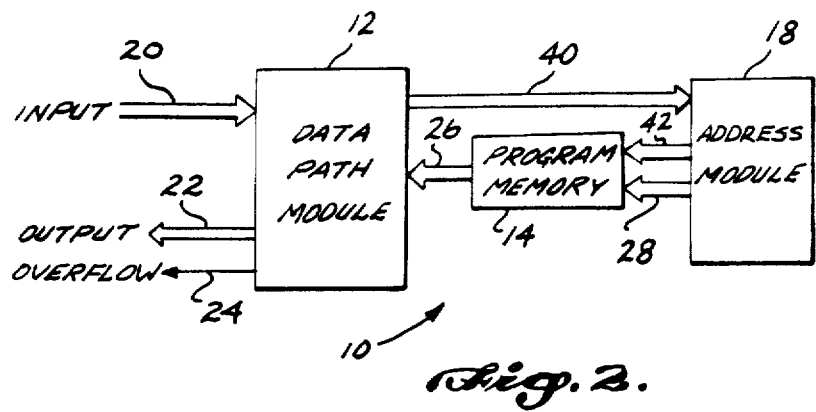
FIG. 2 is a block diagram of the programmable data path device of the present invention.

The principles of the present invention are disclosed, by way of example, by programmable data path device 10 set forth in block diagram form in FIG. 2. Device 10 includes data path module 12, program memory 14, and address module 18. Data path module 12 receives input data via input bus 20, and processes such data to produce output data on output bus 22. An overflow occurring during processing of the data is indicated by an overflow signal on line 24. Program memory 14 comprises a digital, random access memory, preferably realized as RAM or EPROM. The program memory is coupled to data path module 12 by bus 26, and to address module 18 by bus 28. The program memory is programmed or initialized via bus 42. During operation, however, bus 28 controls the data path. Address module 18 may interface to a general purpose microprocessor, in which case the combination of data path module 12 and program memory 14 could be regarded as a general purpose hardware accelerator for the microprocessor.

Program memory 14 stores a plurality of process control words that are sequentially provided to data path module 12 via bus 26. The process control words define the control states of device 10, and control the operation of data path module 12. The sequence in which the process control words are provided on bus 26 is controlled by the sequence of addresses provided to program memory 14 by address module 18 via bus 28. Process control words are loaded into program memory 14 via bus 42.

Figure 3:
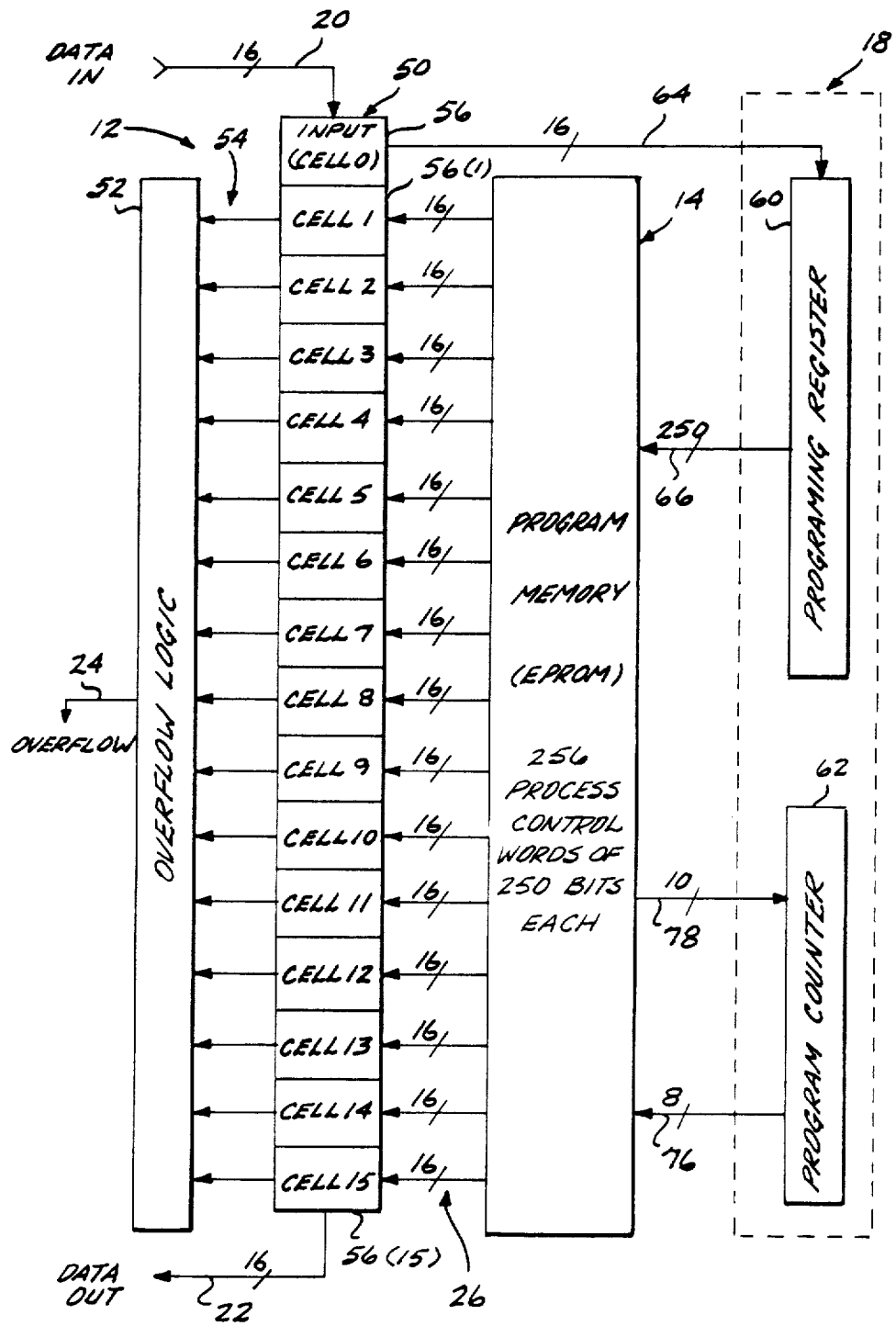
FIG. 3 is a more detailed block diagram of the device of FIG. 2.

FIG. 3 sets forth a more detailed block diagram of one preferred embodiment of the programmable data path device and of a portion of address module 18. In the illustrated embodiment, data path module 12 comprises processing array 50 and overflow logic 52. Processing array 50 comprises sixteen processing cells, input cell 0 identified by reference numeral 56, and general cells 1-15 identified by reference numerals 56(1) through 56(15). Cell 0 is directly connected to bus 20 for receiving the input data. Cell 15 functions as an output cell, and is connected to bus 22 on which the output data is provided. Lines 54 connect all cells other than the input cell to overflow logic 52. Overflow logic 52 is essentially a fifteen input OR gate that produces an overflow signal on line 24 when an overflow signal is received via one of lines 54 from any one or more of processing cells 1-15.

Address module 18 includes programming register 60 and program counter 62. Programming register 60 is used to load a program into program memory 14 prior to commencement of operations by the data path device. The programming register is connected to cell 0 of processing array 50 by bus 64 and to program memory 14 by bus 66. A program to be loaded in program memory 14 may, of course, be loaded directly by address module 18 without first passing through processing array 50.

Figure 4:
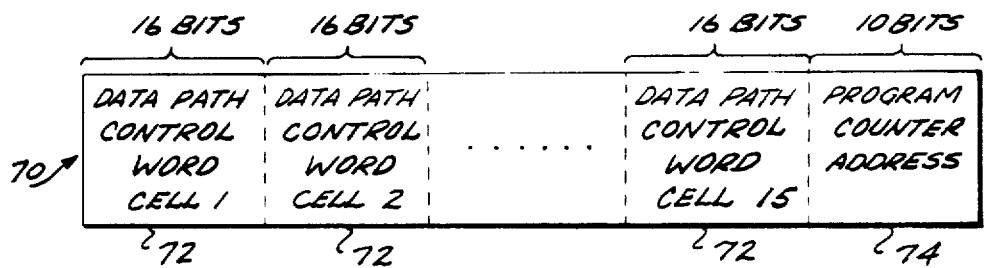
FIG. 4 is a diagram showing the arrangement of program control words in the program memory.

As indicated in FIG. 3, program memory 14 comprises an EPROM memory consisting of 256 process control words, each process control word comprising 250 bits. The format of a single process control word is shown in FIG. 4. Each process control word 70 comprises fifteen data path control words 72 of 16 bits each, plus a ten-bit program counter address 74. During operation of device 10, program counter 62 provides an eight-bit address on bus 76 to program memory 14. The address on bus 76 operates to select one of the 256 process control words in the program memory. The program memory then provides the fifteen data path control words 72 of the selected process control word to respective cells 1-15 of processing array 50, one data path control word per cell. The data path control words are transferred to the processing array via bus 26 that comprises fifteen 16-bit buses, as shown in FIG. 3. At the same time that the data path control words are provided to the processing array, the program memory also provides the ten-bit program counter address 74 to the program counter via bus 78. The ten-bit program counter address includes two control bits and, optionally, an eight-bit branch address. This feature permits branching in the sequence in which process control words 70 are executed by the data path device.

FIG. 5 sets forth one preferred embodiment of the basic architecture of processing array 50. As previously described in connection with FIG. 3, the processing array comprises input cell 56 and general cells 56(1) through 56(15). Input cell 56 comprises a single register 100. Register 100 is connected to receive input from data input bus 20, and to produce output data on bus 64 that is connected to programming register 60, as shown in FIG. 3. The output of register 100 also forms one bus of bus set 102 that is described below.

Each of general processing cells 56(1)-56(15) comprises a multiplexer (MUX) 110, an ALU 112 and a register 114. For each general processing cell, the MUX, ALU and register are all connected to control bus 116 through which the data path control words are provided from program memory 14. Multiplexer 110 is connected to bus set 102, and operates to select the data on two buses of bus set 102 for input to ALU 112 via input buses 120 and 122. ALU 112 includes two input ports connected to buses 120 and 122 respectively, and a single output port coupled to register 114 via output bus 124. Each ALU may be implemented for performing any desired combination or subset of arithmetic (e.g., add, multiply) and/or logical (e.g., NOR, AND) operations. Each ALU also preferably includes an overflow output (not shown in FIG. 5) corresponding to one of lines 54 in FIG. 3. During each processing cycle, ALU 112 produces output data on output bus 124 based upon the input data on buses 120 and 122 and the data path control word on control bus 116. The output of register 114 comprises one of the buses of bus set 102. Thus, during each processing cycle, MUX 110 may select the outputs of any two registers 114 as input to the ALU for the next processing cycle.

Figure 6:
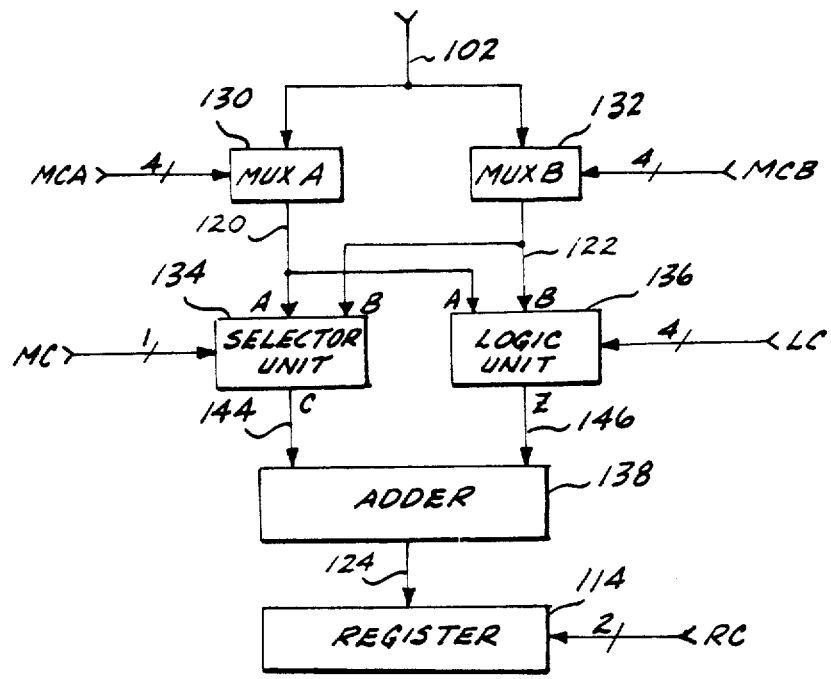
FIG. 6 is a functional block diagram of one processing cell.
Figure 7:
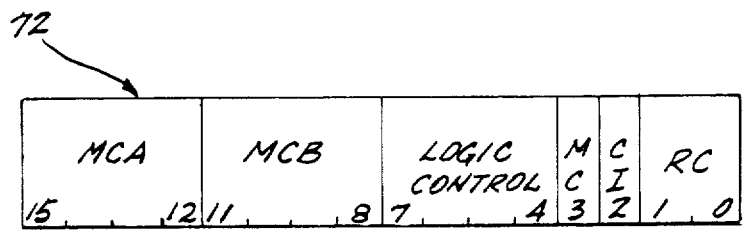
FIG. 7 is a chart showing the fields of a program control word.

Details of one preferred embodiment of a single general processing cell are set forth in FIGS. 6-10. Referring initially to the functional block diagram shown in FIG. 6, each of general processing cells 56(1)-56(15) comprises first multiplexer 130 (MUX A), second multiplexer 132 (MUX B), an ALU comprising selector unit 134, logic unit 136, and adder 138, and register 114. As described above, the general processing cell operates in response to 16-bit data path control words 72 provided by program memory 14. The detailed format of one preferred embodiment of a data path control word is shown in FIG. 7. Data path control word 72 comprises 4-bit MCA and MCB fields that are input to multiplexers 130 and 132 respectively, 4-bit logic control (LC) field that is input to logic unit 136, 1-bit multiplexer control (MC) field that is input to selector unit 134, a 1-bit carry input (CI) field that is described below, and a 2-bit register control (RC) field that is input to register 114.

Each of multiplexers 130 and 132 is connected to the 16 buses comprising bus set 102. The MCA field of the program control word causes multiplexer 130 to select one of the 16 buses of bus set 102 for output onto bus 120. The data word produced by multiplexer 130 on bus 120 is hereby designated data word A. Similarly, the MCB field causes multiplexer 132 to select one of the 16 buses of bus set 102 for output onto bus 122. The data word provided by multiplexer 132 on bus 122 is hereafter designated data word B. The data words (A and B) selected by multiplexers 130 and 132 are input to selector unit 134 and logic unit 136. Selector unit 134 selects data word A or B for output onto output bus 144 as data word C, in response to the 1-bit MC field. Logic unit 136 performs one of 16 possible logical operations in response to the 4-bit LC signal. In one preferred embodiment, logic unit 136 performs the operations shown in FIG. 8 for the 16 indicated LC signals. In FIG. 8, A and B represent data words A and B on buses 120 and 122 respectively, Z represents the data output by logic unit 136 on bus 146, and the single quotation mark represents the logical operation NOT. Other operation sets could, of course, be used for logic unit 136.

Adder 138 performs one of the operations shown in FIG. 8, and produces a 16-bit output data word on bus 124. In a preferred embodiment, register 114 operates in response to the RC field of the current data path control word as shown in FIG. 9. The register either ignores the data on bus 124 and holds its present data, loads the data on bus 124, or loads such data shifted either to the right or left by one bit. Once the register has performed the operation specified by the RC field, the data remaining in the register is then available in bus set 102 for the next processing cycle.

Figure 10:
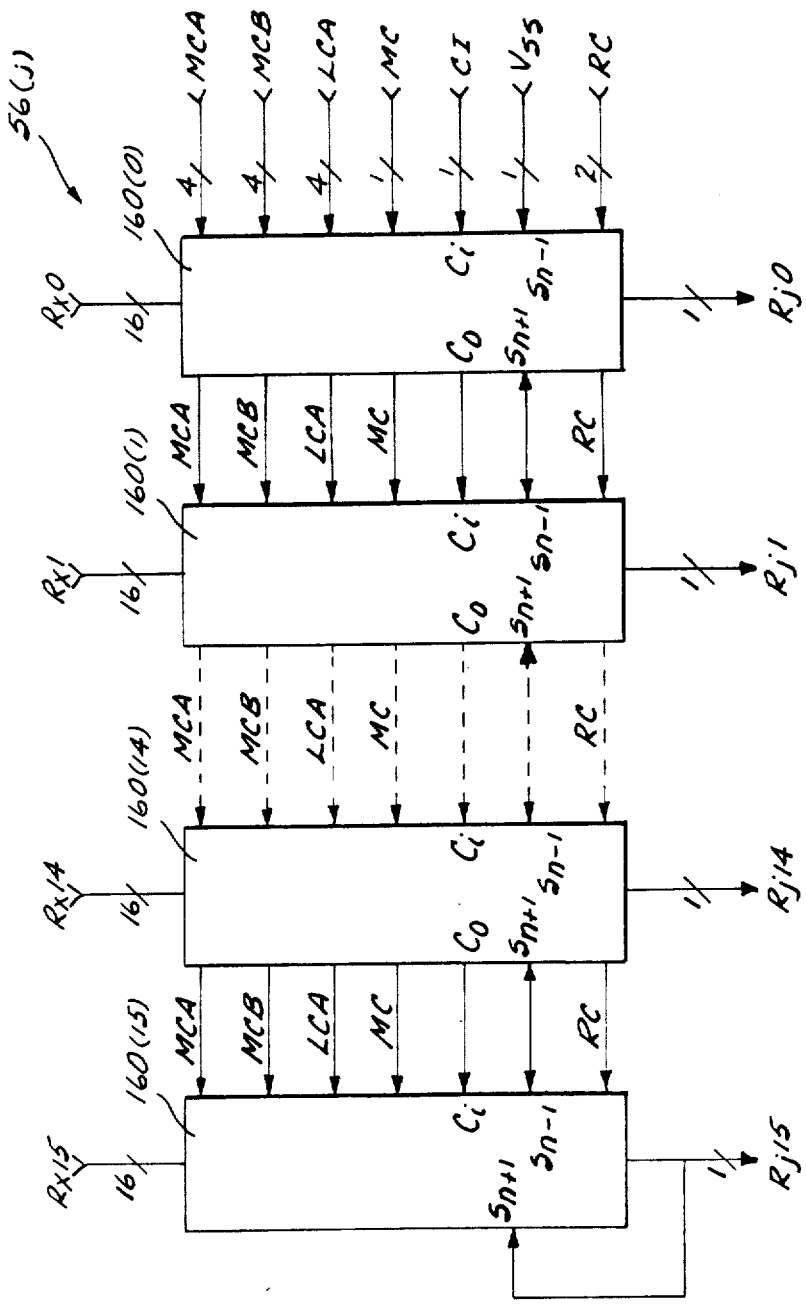
FIG. 10 is an illustration of the processing cell implemented in a bit slice architecture.

The general processing cell functionally diagrammed in FIG. 6 may be implemented by a bit slice architecture such as that shown in FIG. 10. In FIG. 10, general processing cell 56(j) is shown as comprising 16 single-bit processors 160(0) through 160(15). For purposes of this description, the terminology $R_{jk}$ will be used to refer to bit k of register j. Thus, for example, single bit processor 160(k) of general processing cell 56(j) produces a single bit output designated $R_{jk}$. The single bit processor for bit k is connected to receive bit k from each of the 16-bit buses comprising bus set 102. These 16 input lines are represented by the notation $R_{xk}$, wherein x takes on all values between 1 and 16. Each single bit processor contains the functional blocks shown in FIG. 6, i.e., a pair of multiplexers, a selector unit, a logic unit, an adder and a single bit output register. Each single bit processor receives the data path control word fields MCA, MCB, LC, MC and RC, and operates in response to such signals as indicated above with respect to FIG. 6. The adder of each single bit processor also receives a carry input signal ($C_i$) and produces a carry output signal ($C_o$), permitting the single bit processors to perform conventional arithmetic operations. Field CI of the current data path control word forms the carry input signal for single bit processor 160(0). For the other single bit processors, the carry input signal is derived from the carry output signal of the preceding single bit processor. The 1-bit register cells of the single bit processors are also coupled to the register cells of adjacent single bit processors, to permit the shifting operations illustrated in FIG. 9. These connections are illustrated in FIG. 10 by the symbols $S_{n+1}$ and $S_{n-1}$. For single bit processor 160(0), a low bit ($V_{ss}$) or zero is shifted into the least significant end of register 114 for left shift operations, and the output of single bit processor 160(15) is shifted into the register of that single bit processor for right shift operations.

It will be appreciated by those skilled in the art that the architecture illustrated in FIGS. 6–10 is but one of a large number of possible architectures for each processing cell. For example, fewer or more than four bits can be used to control logic unit 136, to provide a suitable number of operations for the logic unit. Furthermore, as stated above, each ALU may be implemented such that it is capable of performing any desired combination of arithmetic or logical operations. The ALU shown in FIGS. 6–10 performs addition and logical operations, and has the advantages that it is simple in design and that it requires a comparatively small area on an integrated circuit. However for many applications involving mathematical calculations, such as digital signal processing, finite element analysis, etc., a preferred ALU will be one capable of performing addition and multiplication. Two particular examples are provided below. Two or more types of ALUs may of course be included in a single device, and ALUs having more than two input ports may also be used. In addition, in some cases, it may be sufficient to provide a single multiplexer, for example to select data word A, with the input for data B being hard wired to a specific register of the same or a different cell.

An example of a computation to which the programmable data path device of the present invention can be applied is the evaluation of a polynomial. A general polynomial equation has the following form:

$$f(x) = A_0 + A_1 x + A_2 x^2 + \ldots + A_n x^n \qquad (1)$$

The number of numeric operations can be reduced by factoring the polynomial in the following manner:

$$f(x) = A_0 + x(A_1 + x(A_2 + \ldots x(A_{n-1} + xA_n))) \qquad (2)$$

There are n multiplications and n+1 additions performed each time that the polynomial is evaluated for a particular value of x. For a conventional von Neumann (sequential) machine, the time required to execute a program that evaluates the polynomial may be given by:

$$T_e = K_a T_a + K_s T_s + K_r T_r + K_i T_i + K_f T_f \qquad (3)$$

where T refers to the time to perform an operation, K refers to the number of times that the operation is carried out, and the subscripts a, s, r, i and f respectively refer to performing an arithmetic operation, storing the result of an operation, loading an operand into a register, performing an I/O operation, and fetching an instruction.

The time that the processor actually transforms data, i.e., the time in which useful work is performed, is $K_a T_a$. Therefore, the efficiency of the machine is $K_a T_a / T_e$. In general, $T_a$ is no larger than any of the other time periods, and is typically smaller. Moreover, $K_a$ is less than or equal to $K_s$, $K_r$ and $K_f$. For a real-time controller with significant input and output, $K_a$ could be approximately the same as $K_i$. Therefore, assuming that all of the above products are about the same, the efficiency of a conventional stored program machine is approximately 20 percent.

Since n multiplications and n+1 additions are needed for each polynomial evaluation, and assuming a hardware multiplier is available to the ALU, then:

$$K_a = 2n + 1 \qquad (4)$$

For a polynomial of order 50, and for multiply/add times of 1 microsecond, then the evaluation time is 101 microseconds for each value of x. If the software and microprocessor efficiency is 20 percent, as described above, then the evaluation times becomes 505 microseconds.

Figure 11:
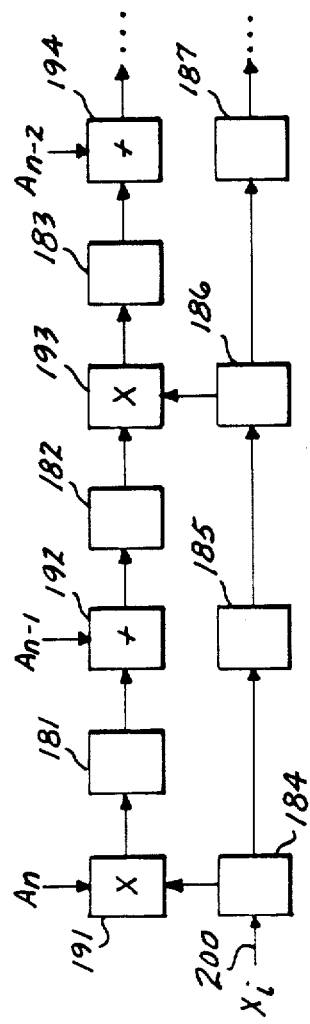
FIG. 11 is a block diagram representing a pipeline architecture for evaluating a polynomial.

FIG. 11 depicts a pipeline architecture for evaluating the polynomial set forth in Equation (2) above, and FIG. 12 shows the mapping of this pipeline architecture into the programmable data path device of the present invention. In FIG. 11, blocks 181-187 represent registers, and blocks 191-194 represent ALU operations of multiplication and addition, as indicated. Each new value $x_i$ is introduced via line 200 into block 184, and moves one block to the right, through blocks 185-187, for each processing step. For each new value $x_i$, block 191 multiplies that value by $A_n$, and places the result in register 181. During the next processing step, block 192 adds $A_{n-1}$ to the value in register 181, and places the result in register 182, etc. It may therefore be seen that the architecture shown in FIG. 11 implements the polynomial evaluation operations set forth in Equation (2) above. This pipeline architecture requires 2n+1 processing steps to fill the pipe, and completes the evaluation for a given value of x for each processing step thereafter. The time required for each processing step is governed by the add/multiply time. Assuming the same multiplier is available as in the example above, such that the processing step period is on the order of 1 microsecond, then 101 microseconds are required to fill the pipe for a polynomial of order 50. If a thousand values of x are to be evaluated, however, the total evaluation time would only be 1.1 milliseconds. Thus this pipeline architecture is 460 times faster than a conventional von Neumann machine.

The mapping of the architecture of FIG. 11 into the data path device of the present invention is a straightforward exercise. One example of such a mapping is set forth in FIG. 12. The arrangement of FIG. 12 is adapted for evaluation of the following third order polynomial:

$$f(x) = A_0 + A_1 x + A_2 x^2 + A_3 x^3 = A_0 + x(A_1 + x(A_2 + xA_3))) \qquad (5)$$

FIG. 12 depicts input cell 56 and general processing cells 56(1) through 56(10). Each cell includes register 114. The operation for which each cell is programmed is also indicated in FIG. 12, these operations being INPUT for input cell 56, PASS, MULTIPLY and ADD. The designation PASS means that the cell simply passes the data from a predetermined source register to its own register during each processing step. The designations MULTIPLY and ADD respectively mean that the general processing cell multiplies or adds the data from two prescribed sources, and places the result in its register, during each processing step. It is assumed that each processing step contains two stages: (1) an input stage in which registers 114 are coupled to bus set 102 and presented for input to the multiplexers of the various cells, and (2) a step in which the registers are coupled to the respective ALUs, and the ALUs process the input data and place the result in the registers. With this assumption, FIG. 12 represents a snapshot of the cells at the end of the second step, i.e., when new values have just been written into registers 114. It is further assumed that the first value of x input to the pipeline was $x_1$, and that the most recently supplied value was $x_6$. For cell 56(6), the symbol $x_5 A_3$ at one input indicates that this product was produced in register 114 of block 56(5) during the last processing step, and was available at the indicated input to cell 56(6) during the present, just completed, processing step. During such just completed step, cell 56(6) added $x_5 A_3$ to $A_2$, and placed the result in its register 114. It is further assumed that the values $A_0$–$A_3$ are provided from four of the cells, not illustrated, e.g., cells 56(11) through 56(14). For these cells, after the initial loading of the constants, register function codes symbolizing "hold present data," e.g., RC code 00 shown in FIG. 9, would be provided so that these values would remain available throughout the processing.

An example of an application in which the programmable data path device of the present invention can advantageously operate in parallel mode is in a digital filter implementation. An example of a digital filter equation is:

$$y_n = \sum_{k=0}^{n} A_k x_{n-k} \qquad (6)$$

There are n+1 multiplications and n additions performed for each sample $x_i$. For a von Neumann machine, assuming a filter of order 50, and a multiply/add time of 1 microsecond, then the evaluation time would be 101 microseconds for each sample. If the software and microprocessor efficiency is 20 percent, then the evaluation time would be about 0.5 milliseconds per sample. Implementation of the digital filter in a parallel processing mode using the present invention is illustrated in FIG. 13 in a format similar to that of FIG. 11, for a value of n=4.

Figure 13:
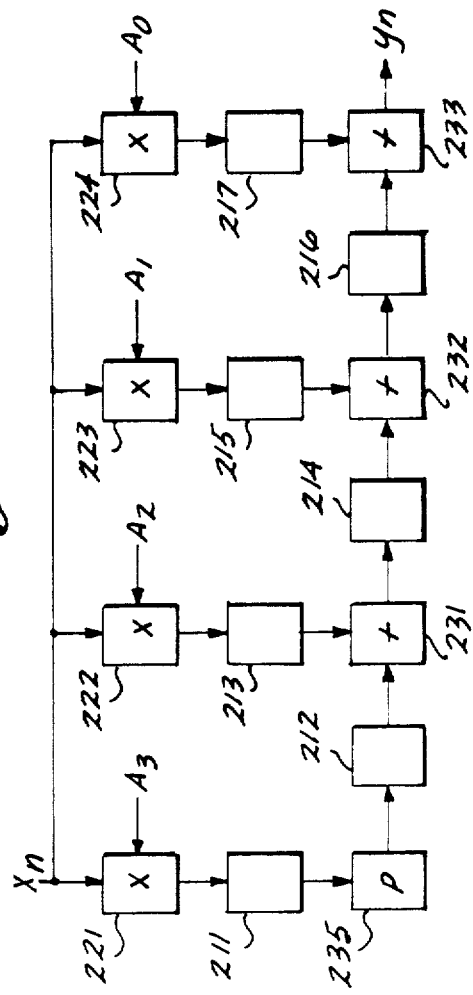
Figure 13:
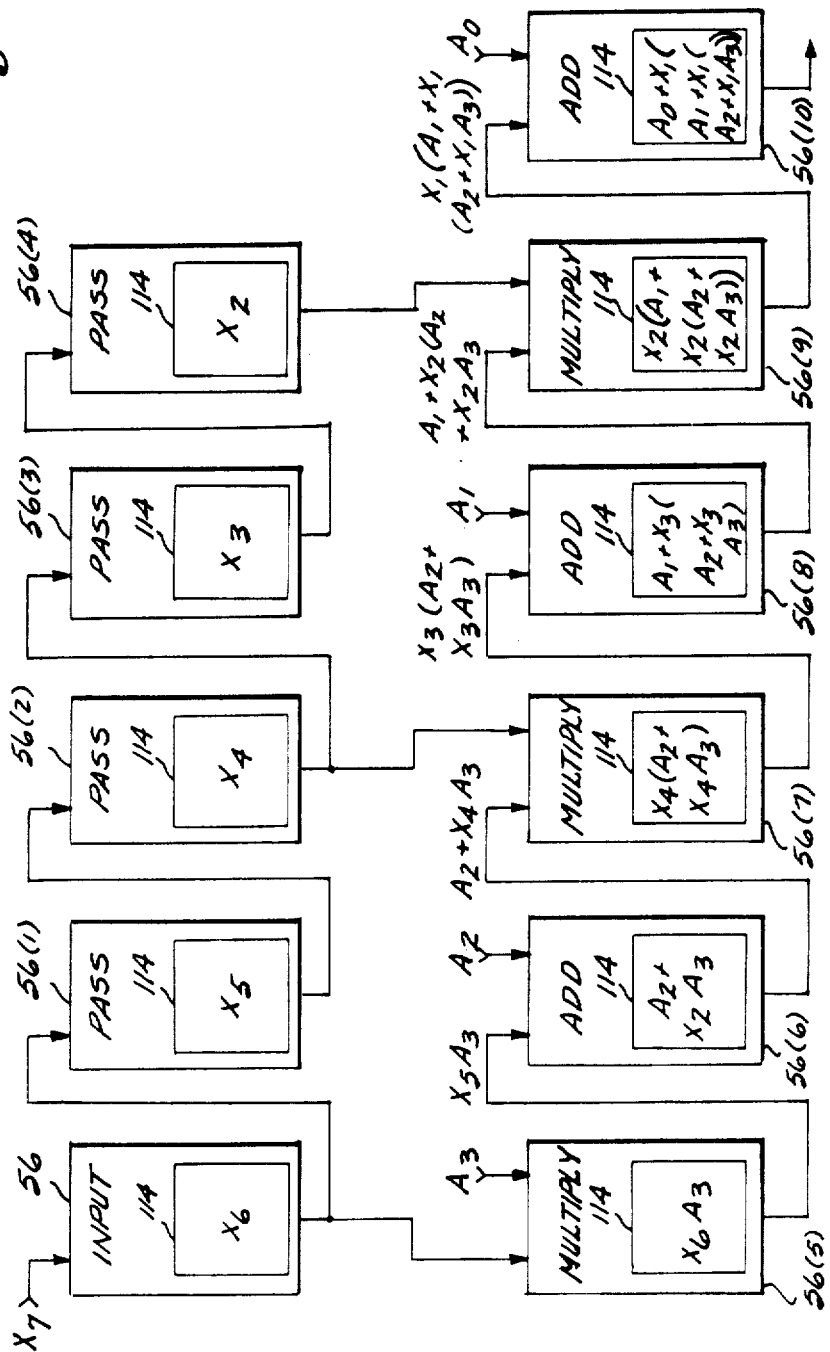

In FIG. 13, blocks 211-217 represent registers, blocks 221-224 represent ALU operations of multiplication, blocks 231-233 represent ALU operations of addition, and block 235 represents a pass through operation. The mapping of the architecture of FIG. 13 into the programmable data path device of the present invention is straightforward, and follows the general format shown in FIGS. 11 and 12. This architecture produces a new value of $y_n$ for each processing step, i.e., each microsecond, representing an improvement by a factor of about 500 as compared to a von Newmann architecture.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A programmable data path device, comprising:
   a plurality of processing cells, each processing cell including means for receiving a data path control word that may be different from the data path control words received by the other processing cells, each processing cell further including ALU means having two ALU input ports, one ALU output port, and means for producing output data at the ALU output port based on input data provided at the ALU input ports and on the data path control word, each processing cell further including a register for receiving the output data from the ALU means of the processing cell of which the register is a part, and each processing cell further including multiplexer means connected to the registers of all the processing cells and responsive to the data path control word for selectively coupling the contents of the register of one of the plurality of processing cells to one of the input ports;

memory means coupled to the processing cells and including means for storing at least one data path control word associated with each processing cell; and control means coupled to the memory means for providing data path control words stored in the memory means to the associated processing cells.

2. The device of claim 1, wherein the memory means stores a plurality of process control words, each process control word comprising one data path control word for each processing cell, the memory means including means for providing the data path control words of a single process control word to the respective processing cells in response to a memory address signal, and wherein the control means comprises a program counter means for providing the memory address signal.

3. The device of claim 1, wherein the multiplexer means includes a first multiplexer for selectively coupling the contents of the register of one of the plurality of processing cells to one of the ALU input ports, and a second multiplexer for selectively coupling the contents of the register of one of the plurality of processing cells to the other ALU input port.

4. The device of claim 3, wherein the data path control word comprises first and second multiplexer control fields, wherein the first multiplexer is responsive to the first multiplexer control field for selectively coupling the contents of the register of one of the plurality of processing cells to one of the input ports, and wherein the second multiplexer is responsive to the second multiplexer control field for selectively coupling the contents of the register of one of the plurality of processing cells to the other input port.

5. The device of claim 3, wherein the ALU comprises an adder having first and second adder input ports and an adder output port, the adder output port comprising the ALU output port, the ALU further comprising a logic unit including means for providing a logical operation on the data provided at the ALU input ports and to provide logic output data to the first adder input port.

6. The device of claim 5, wherein the ALU comprises a selector unit comprising means for coupling the data at one of the ALU input ports to the second adder input port.

7. The device of claim 3, wherein each processing cell comprises a plurality of single bit processors.

8. The device of claim 1, wherein each ALU includes addition means and multiplication means.

* * * * *